United States Patent [19]

Bush

[11] 3,971,734

[45] July 27, 1976

[54] SULFITE COMPOSITIONS, AQUEOUS SULFITE SOLUTIONS AND METHOD OF DECREASING THEIR RATE OF OXIDATION

[75] Inventor: Harley E. Bush, Houston, Tex.

[73] Assignee: NL Industries, Inc., New York, N.Y.

[22] Filed: Mar. 3, 1975

[21] Appl. No.: 555,070

Related U.S. Application Data

[62] Division of Ser. No. 392,344, Aug. 28, 1973, Pat. No. 3,899,293.

[52] U.S. Cl.............. 252/389 A; 252/400 A; 21/2.7 A; 166/244 C; 423/269
[51] Int. Cl.².............. C09K 3/00; C09K 15/32; C23F 9/00; C01F 1/00
[58] Field of Search........... 252/389 A, 400 A; 21/2.7 A, 2.7 R, 2.5 A; 423/269, 512; 166/244 C, 252

[56] References Cited

UNITED STATES PATENTS

| | | | |
|---|---|---|---|
| 2,318,663 | 5/1943 | Bird | 21/2.7 R |
| 2,901,439 | 8/1959 | Burke | 252/389 A |
| 3,234,124 | 2/1966 | Irani | 210/38 |
| 3,235,324 | 2/1966 | Merriman | 21/2.7 |
| 3,258,072 | 6/1966 | Froning | 166/252 |
| 3,301,323 | 1/1967 | Parsons | 175/64 |
| 3,331,773 | 7/1967 | Gunderson | 21/2.7 A |
| 3,483,133 | 12/1969 | Hatch | 21/2.7 R |
| 3,528,502 | 9/1970 | Oleen | 252/389 A |
| 3,532,639 | 10/1970 | Hatch | 252/389 A |
| 3,634,232 | 1/1972 | Dunlop | 21/2.7 R |
| 3,655,556 | 4/1972 | Allen | 252/389 A |
| 3,803,047 | 4/1974 | Hwa | 252/389 A |
| 3,816,333 | 6/1974 | King | 252/389 A |
| 3,899,293 | 8/1975 | Bush | 21/2.7 A |

*Primary Examiner*—Samuel W. Engle
*Assistant Examiner*—Donald P. Walsh
*Attorney, Agent, or Firm*—Roy F. House; Delmar H. Larsen; Robert L. Lehman

[57] ABSTRACT

The invention provides compositions and aqueous solutions containing a sulfite compound chosen from alkali metal and ammonium sulfites and bisulfites and at least one water soluble stabilizing compound which is an organic phosphonate containing at least two phosphonic acid groups per molecule. Also provided is a method of reducing the oxidation rate of aqueous sulfite solutions caused by oxygen in the atmosphere and a method of decreasing the corrosiveness to ferrous metals of aqueous systems containing dissolved oxygen and at least one divalent cation derived from iron, cobalt, copper, manganese, and nickel.

18 Claims, No Drawings

SULFITE COMPOSITIONS, AQUEOUS SULFITE SOLUTIONS AND METHOD OF DECREASING THEIR RATE OF OXIDATION

RELATED APPLICATION

This application is a division of copending application Ser. No. 392,344, filed Aug. 28, 1973, now U.S. Pat. No. 3,899,293.

BACKGROUND OF THE INVENTION

1. Field.

This invention relates to the art of decreasing the corrosion of ferrous metals and to the art of decreasing the rate of oxidation of aqueous solutions of alkali metal and ammonium sulfites and bisulfites upon exposure to a source of oxygen such as the atmosphere.

2. Prior Art

Over the years many investigators have studied the oxidation of sulfites and the effect of various substances on the oxidation of sulfites. Known catalysts for the reaction are certain heavy metal cations, particularly divalent cobalt, copper, iron, manganese, and nickel. Many chemicals are known to either inhibit or retard the oxidation. These are generally free radical scavengers.

It is well known to use alkali metal and ammonium sulfites and bisulfites, preferably sodium sulfite, as corrosion inhibitors in aqueous systems containing dissolved oxygen which contact ferrous metals. The sulfite reacts with the oxygen to eliminate it from the system thus preventing its reaction with the ferrous metal. Two books which discuss the corrosion of ferrous metals and the use of sulfites for corrosion protection are: Metallic Corrosion Passivity and Protection, Ulick R. Evans, Longmans, Green and Co. (New York), 1946; Corrosion and Corrosion Control, Herbert H. Uhlig, John Wiley and Sons, Inc. (New York), 1963.

SUMMARY OF THE INVENTION

I have now found that the stability of aueous sulfite solutions to oxidation by oxygen in the atmosphere is increased by adding to such solutions a water soluble organic phosphonate compound containing at least two phosphonic acid groups per molecule. Solutions containing one or more sulfites and a polyphosphonate as more particularly described hereinafter remain useful for longer periods of time and are especially effective in decreasing the corrosion of ferrous metals which are contacted by large volumes of water containing dissolved oxygen and which thus need to be continuously treated with an oxygen scavenging solution.

Accordingly it is an object of this invention to provide aqueous sulfite solutions having increased resistance to oxidation by atmospheric oxygen. It is another object of this invention to provide a sulfite composition which is useful in preparing aqueous sulfite solutions having increased resistance to oxidation by atmospheric oxygen. It is still another object of this invention to provide a method of decreasing the rate of atmospheric oxidation of aqueous sulfite solutions. Another object of this invention is to provide a method of reducing the corrosion of ferrous metals contacted by aqueous systems containing dissolved oxygen and a divalent cation selected from the group consisting of iron, cobalt, copper, manganese, and nickel.

DESCRIPTION OF THE PREFERRED EMBODIMENTS OF THE INVENTION

The rate of oxidation of aqueous sulfite solutions can be decreased by adding to such solutions a water soluble stabilizing compound which is an organic phosphonate containing at least two phosphonic acid groups per molecule.

Preferred stabilizing compounds are selected from the group consisting of the free acids and water soluble salts of:

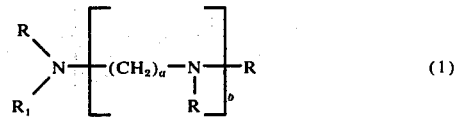

where each R is independently selected from the group consisting of hydrogen, $-CH_2PO(OH)_2$, and $-(C_nH_{2n}O)_cH$ wherein $n$ is 2 to 4 and $c$ is 1 to 3; $R_1$ is

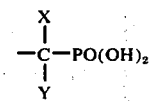

wherein X and Y are independently selected from the group consisting of hydrogen and lower alkyl radicals having 1 to 4 carbon atoms; $a$ is 2 to 6 and $b$ is 0 to 6; provided that at least ½ of the radicals represented by R are $-CH_2PO(OH)_2$;

where R is $-CH_2PO(OH)_2$, $R_1$ is selected from the group consisting of hydrogen, hydroxyl, and $-(C_nH_{2n}O)_cH$ wherein $n$ is an integer from 2 to 4 and $c$ is an integer from 1 to 3, and where $R_2$ is selected from the group consisting of lower alkyl radicals containing 1 to 5 carbon atoms and

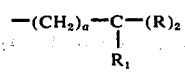

wherein $a$ is an integer from 0 to 8; and

where
R is $-CH_2PO(OH)_2$, each $R_1$ is independently selected from the group consisting of hydrogen, $-CH_2PO(OH)_2$, and $-(C_nH_{2n}O)_cH$ wherein $n$ is an integer from 2 to 4 and $c$ is an integer from 1 to 3, and where $R_2$ is selected from the group consisting of lower alkyl radicals containing 1 to 5 carbon atoms and

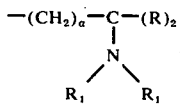

wherein $a$ is an integer from 0 to 8.

Most particularly preferred stabilizing compounds are

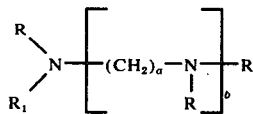

where R is $-CH_2PO(OH)_2$, $R_1$ is $-CH_2PO(OH)_2$, $a$ is either 2 or 6 and $b$ is 0 to 4, especially those compounds wherein $b$ is 0 or wherein $a$ is 6 and $b$ is 1 to 4.

Compounds represented by formula (1),

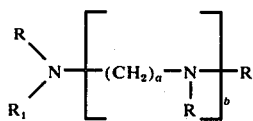

where each R is independently selected from the group consisting of hydrogen, $-CH_2PO(OH)_2$, and $-(C_nH_{2n}O)_cH$ wherein $n$ is 2 to 4 and $c$ is 1 to 3; $R_1$ is

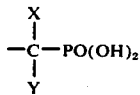

wherein X and Y are independently selected from the group consisting of hydrogen and lower alkyl radicals having 1 to 4 carbon atoms; $a$ is 2 to 6 and $b$ is 0 to 6, are well known polyphosphonates as described in the following United States patents, incorporated herein by reference: U.S. Pat. Nos. 3,234,124 (Irani); 3,288,846 (Irani et al.); 3,383,323 (Irani); 3,434,969 (Ralston); 3,532,167 (Noe et al.); 3,613,788 (Kautsky); 3,738,937 (Kautsky).

Compounds represented by formula (2),

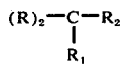

where R is $-CH_2PO(OH)_2$, $R_1$ is selected from the group consisting of hydrogen and hydroxyl, and where $R_2$ is selected from the group consisting of lower alkyl radicals containing 1 to 5 carbon atoms and

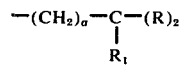

wherein $a$ is an integer from 0 to 8, are well known polyphosphonates as disclosed in the following United States patents, incorporated herein by reference: U.S. Pat. Nos. 3,214,454 (Rlaser et al.); 3,483,925 (Slyker); 3,496,223 (Irani et al.) 3,532,639 (Hatch). Compounds wherein $R_1$ is $-(C_nH_{2n}O)_cH$ wherein $n$ is an integer from 2 to 4 and $c$ is an integer from 1 to 3 may be prepared from the compounds described in these patents by reaction of these compounds with either ethylene oxide ($n$=2), propylene oxide ($n$=3), or butylene oxide ($n$=4) in the required molar ratio.

Compounds represented by formula (3),

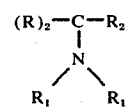

where R is $-CH_2PO(OH)_2$, $R_1$ is hydrogen, and $R_2$ is selected from the group consisting of lower alkyl radicals containing 1 to 5 carbon atoms and

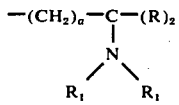

wherein $a$ is an integer from 0 to 8, are well known polyphosphonates as disclosed in U.S. Pat. No. 3,303,139 (Blaser et al.), incorporated herein by reference, and Belgium Pat. No. 781,462. Compounds wherein $R_1$ is $-(C_nH_{2n}O)_cH$ where in $n$ is an integer from 2 to 4 and $c$ is an integer from 1 to 3 may be prepared from the compounds described in U.S. Pat. No. 3,303,139 by reaction of these compounds with either ethylene oxide ($n$=2), propylene oxide ($n$=3), or butylene oxide ($n$=4) in the required molar ratio. Compounds wherein $R_1$ is $-CH_2PO(OH)_2$ may be prepared from the compounds described in U.S. Pat. No. 3,303,139 by reaction of these compounds with formaldehyde and phosphorous acid as disclosed in U.S. Pat. No. 3,288,846 (Irani et al.).

Other water soluble polyphosphonates that contain at least two phosphonic acid groups per molecule which may be used in the practice of this invention are disclosed in the following United States patents, incorporated herein by reference:

| U.S. Pat. No. | 3,733,270 (Kerst); | 3,674,804 (Redmore); |
|---|---|---|
| | 3,576,783 (Kerst); | 3,556,762 (Hamm); |
| | 3,551,339 (Quimby); | 3,549,728 (Balde et al.); |
| | 3,497,313 (Quimby); | 3,400,176 (Quimby); and |
| | 3,400,148 (Quimby). | |

The pholyphosphonate stabilizing compound must be water soluble and is preferably an alkali metal salt, more particularly a sodium salt, of the polyphosphonic acids. Other salts which are useful in this invention are ammonium, lower alkyl ammonium containing from 1–5 carbon atoms; monethylolammonium, diethylolammonium, triethylolammonium, and partial divalent cation salts wherein the divalent cation replaces no more than ⅓ of the acidic hydrogen in the phosphonic acid groups. The preferred divalent cation is zinc. The free acids may also be used and are intended herein to be included in the term polyphosphonates as well as in the term polyphosphonic acids.

Representative non-limiting compounds of formula (1) which are useful in this invention are the free acids and water soluble salts of nitrilo trimethylenephosphonic acid, nitrilo dimethylenephosphonic acid, nitrilo-N-hydroxyethyl-N, N-dimethylenephosphonic acid, nitrilo-N-diethoxyethanol-N, N-dimethylenephosphonic acid, ethylenediamine tetramethylenephosphonic acid, ethylenediamine-N-hydroxyethyl-N, N', N'-trimethylenephosphonic acid, tetraethylenepentamine heptamethylenephosphonic acid, hexamethylenediamine tetramethylenephosphonic acid, and trihexamethylenetetramine hexamethylenephosphonic acid.

The sulfite compounds useful in this invention are selected from the group consisting of alkali metal sulfites, ammonium sulfite, alkali metal bisulfite, and ammonium bisulfite. The preferable sulfite compound is sodium sulfite, $Na_2SO_3$.

The concentration of sulfite compound in aqueous solution is not critical and may be any concentration up to saturation. Preferably the solution will contain from 5% up to saturation of the sulfite compound as lower concentrations require the handling of excessively large volumes of solution.

The concentration of the stabilizing compound must be sufficient to decrease the rate of oxidation due to the oxygen in the atmosphere of the sulfite compound in the aqueous solution. Thus it must be sufficient to provide a concentration of the sulfite compound which is greater than in the absence of the stabilizing compound upon exposing the solution to the atmosphere. Preferably the concentration of the water soluble salt of the stabilizing compound is from 1 to 20% by weight based on the concentration of the sulfite compound.

It is preferred in the practice of this invention to prepare a sulfite composition which contains the sulfite compound in admixture with the polyphosphonate stabilizing compound prior to forming the aqueous solution. In this manner only one product needs to be shipped and handles to prepare an aqueous sulfite solution which is useful as an oxygen scavenger to reduce the harmful effects of oxygen in aqueous systems, particularly the corrosion of ferrous metals. Such aqueous systems may be at remote, relatively inaccessible locations such as drilling fluids for oil and gas wells and waterflood treating solutions for increasing the recovery of oil from petroleum containing formations.

Thus it is preferred to prepare a sulfite composition containing a major proportion of a sulfite compound selected from the group consisting of alkali metal sulfites, alkali metal bisulfites, ammonium sulfite, ammonium bisulfite, and mixtures thereof, and a water soluble salt of a stabilizing compound in an amount sufficient to decrease the rate of atmospheric oxidation in the presence of water of the sulfite compound selected from the group consisting of:

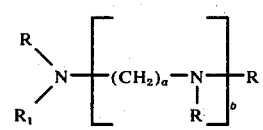

(1)

where each R is independently selected from the group consisting of hydrogen, $-CH_2PO(OH)_2$, and $-(C_nH_{2n}O)_cH$ wherein $n$ is 2 to 4 and $c$ is 1 to 3; $R_1$ is

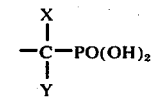

wherein X and Y are independently selected from the group consisting of hydrogen and lower alkyl radicals having 1 to 4 carbon atoms; $a$ is 2 to 6 and $b$ is 0 to 6; provided that at least ½ of the radicals represented by R are $-CH_2PO(OH)_2$;

(2)

where R is $-CH_2PO(OH)_2$, $R_1$ is selected from the group consisting of hydrogen, hydroxyl, and $-(C_nH_{2n}O)_cH$ wherein $n$ is an integer from 2 to 4 and $c$ is an integer from 1 to 3, and where $R_2$ is selected from the group consisting of lower alkyl radicals containing 1 to 5 carbon atoms and

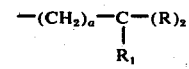

wherein $a$ is an integer from 0 to 8; and

(3)

where R is $-CH_2PO(OH)_2$, each $R_1$ is independently selected from the group consisting of hydrogen, $-CH_2PO(OH)_2$, and $-(C_nH_{2n}O)_cH$ wherein $n$ is an integer from 2 to 4 and $c$ is an integer from 1 to 3, and where $R_2$ is selected from the group consisting of lower alkyl radicals containing 1 to 5 carbon atoms and

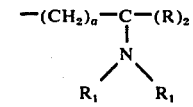

wherein $a$ is an integer from 0 to 8.

Preferably the sulfite composition contains from 1% to 20% by weight, based on the concentration of the sulfite compound, of the water soluble salt. The free acids of these polyphosphonate stabilizing compounds are not easily obtained in dry powder form and are thus not intended to be used in this sulfite composition. Other polyphosphonates as disclosed herein may also be used.

The aqueous sulfite solutions of this invention are particularly useful in reducing the corrosion of ferrous metals which are in contact with an aqueous system containing dissolved oxygen and at least one metallic cation selected from the group consisting of ferrous ($Fe^{++}$), cobaltous ($Co^{++}$), nickelic ($Ni^{++}$), manganous ($Mn^{++}$), and cupric ($Cu^{++}$).

The corrosion of ferrous metals in contact with such a system is decreased by the removal of the oxygen from the system. This is preferably accomplished by adding to the aqueous system sufficient of the aqueous sulfite solution described herein to provide an excess sulfite ($SO_3^{--}$) concentration in the system of from 20 parts per million parts by weight (ppm) to 100 ppm above the concentration of sulfite required to react with the oxygen in the system. Thus for (X) ppm of oxygen in the aqueous system to be treated, the amount of sulfite to be added is 5(X) ppm plus 20 to 100 ppm.

The corrosion of a ferrous metal contacted by the aqueous system will be reduced in proportion to the amount of oxygen removed from the system. Total removal of the molecular oxygen in the system will effectively eliminate the corrosion of the ferrous metal which is caused by the presence of the oxygen in the system. Thus it is preferable that the sulfite compound and the oxygen react to remove essentially all of the oxygen from the system before contacting the ferrous metal with the system.

It is well known that metallic cations such as the ferrous, cobaltous, nickelic, manganous, and cupric cations act as catalysts to speed up the rate of reaction between the sulfite anion and oxygen. I have determined that the aqueous system to be treated must contain a concentration of at least one of these cations which is sufficient to catalyze the reaction of the sulfite compound with the oxygen in the system in order to provide a fast reaction rate such that the treated system need not be held in a retaining tank or other storage vessel until the sulfite compound and the oxygen have had time to react before contacting the ferrous metal.

The concentration of metallic cation needed to effectively catalyze the reaction is dependent upon the concentration of other multivalent cations in the aqueous system. Thus in a relatively pure water to be treated wherein the catalytic metallic cation is the only cation present, the concentration of the cation required to catalyze the reaction is much greater than would be required if the stabilizing compound were not present. In this case the concentration of catalytic metallic cation in the system is about 5 ppm. As the concentration of other multivalent cations in the system increases, particularly the hardness cations calcium and magnesium, the concentration of the catalytic metallic cation needed to effectively catalyze the reaction between the sulfuric and oxygen decreases. Oil field brines containing high concentrations of hardness cations need contain only about 0.5 ppm or more of the catalytic metallic cation to produce a fast reaction rate. Apparently these other multivalent cations complex with the stabilizing compound preventing the stabilizing compound from complexing with the catalytic metallic cation or at least delaying its reaction with the catalytic metallic cation until after the metallic cation has catalyzed the reaction between the sulfite compound and the oxygen.

The preferred aqueous systems to be treated with the aqueous sulfite solution of this invention are low solids water base drilling fluids, flood waters used in treating subterranean formations, and waste effluents pumped into disposal wells.

Low solids drilling fluids contain less than about 6% solids and generally contain one or more polymers which function as viscosifiers, suspending agents, bentonite beneficients and shale flocculants. Representative low solids drilling fluids are disclosed in the following United States patents, incorporated herein by reference: U.S. Pat. Nos. 3,070,543 (Scott); 3,323,603 (Lammus et al.); 3,338,320 (Gilson et al.); 3,360,461 (Anderson et al.).

The use of sulfites to reduce the corrosion of well drilling tools, drill pipe and other ferrous surfaces during drilling operations is disclosed in U.S. Pat. No. 3,301,323 (Parsons), incorporated herein by reference.

Flood waters used in treating subterranean formations in secondary recovery operations to increase the yield of petroleum from such formations are generally either fresh ground waters as obtained from lakes, rivers, wells and the like, and brine waters obtained from producing wells. The use of sulfites in flood waters is described in the following United States patents, incorporated herein by reference: U.S. Pat. Nos. 3,119,447 (Raifsnider et al.); 3,258,072 (Froning).

The following examples will further illustrate the invention and are not intended to limit the invention. The limits of the invention are incorporated into the appended claims.

EXAMPLE 1

An aqueous solution containing 10% by weight of analytical reagent grade sodium sulfite was prepared and divided into three separate solutions. To one solution was added 0.1% by weight (1% by weight based on the concentration of sodium sulfite) of the pentasodium salt of nitrilo trimethylenephosphonic acid while to another solution was added 1.0% by weight of the same polyphosphonate. One solution was not further treated. One hundred grams of each of these solutions were placed in separate 1 pint covered jars. These solutions were aged at room temperature (R. T.) for 4 days after which the lids were removed and the solutions aged an additional 10 days. The residual sulfite concentration remaining in the solutions after different aging periods was determined by the following procedure: 0.2 ml. of the aqueous sulfite solution was diluted with 100 ml. of distilled water; 6–8 drops of 0.5% phenolphthalein indicator solution was added followed by 2 ml. of 15% hydrochloric acid and 2 ml. of starch indicator solution. The solution was then stirred until the red color disappeared; the solution was titrated with 0.0125 N iodide-iodate solution (1 ml. is equivalent to 0.5 mg. $SO_3^{--}$) until a faint permanent blue color developed in the solution; the concentration of residual sulfite in the diluted solution in ppm was obtained by multiplying the ml. of the iodideiodate solution used by 5.

The results obtained are given in Table I. These results indicate that the concentration of sulfite in the untreated aqueous solution decreased at a faster rate than did the concentration of sulfite in the treated solutions. Thus the addition of the polyphosphonate stabilizing compound significantly decreased the rate of atmospheric oxidation of the aqueous sulfite solution.

Table I

| % Stabilizing Compound | 10% Sodium Sulfite Solutions Sulfite Concentration, ppm Days Aging at Room Temperature | | | | | % of Initial Sulfite Remaining After 2 Days |
|---|---|---|---|---|---|---|
| | Initial | 1 | 2 | 4 | 14 | |
| 0 | 108 | 95 | 82 | 58 | 1 | 76 |
| 0.1 | 112 | 113 | 103 | 83 | 20 | 92 |
| 1.0 | 122 | 106 | 117 | 113 | 54 | 96 |

EXAMPLE II

An aqueous solution containing 10% by weight of technical grade sodium sulfite was prepared. To separate aliquots of this solution was added various concentrations of either the pentasodium salt of nitrilo trimethylenephosphonic acid or a mixture of polyphosphonic acids having the formula

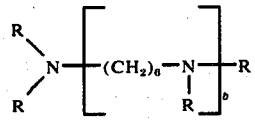

where R is —CH$_2$PO(OH)$_2$ and $b$ is 2 to 4, as indicated in Table II. These solutions were then aged for 2 days and tested as indicated in Example I except that the solutions remained uncovered while aging at room temperature. Aqueous solutions similarly prepared were also aged at a temperature of 120°F. Any water which evaporated during aging was replaced prior to sampling the sulfite solution for residual sulfite testing.

The results obtained are given in Table II. These results indicate that the polyphosphonates reduced the rate of oxidation of the sulfite compound. The acidic polyphosphonate was not effective at higher concentrations upon aging the solutions at 120°F., however.

Table II

| Stabilizing Compound* | % Stabilizing Compound | Aging Temp.,°F | 10% Na$_2$SO$_3$ Solutions PPM Sulfite Concentration Days Aging | | | % of Initial Sulfite Remaining After 2 days |
|---|---|---|---|---|---|---|
| | | | Initial | 1 | 2 | |
| None | 0 | 73 | 120 | 70 | 9 | 7.5 |
| A | 0.1 | 73 | 126 | 86 | 53 | 42 |
| A | 1.0 | 73 | 131 | 95 | 69 | 52 |
| A | 2.0 | 73 | 130 | 104 | 85 | 65 |
| B | 0.1 | 73 | 130 | 111 | 89 | 68 |
| B | 1.0 | 73 | 125 | 96 | 69 | 55 |
| B | 2.0 | 73 | 132 | 10 | 52 | 39 |
| None | 0 | 120 | 120 | 94 | 43 | 35 |
| A | 0.1 | 120 | 126 | 124 | 108 | 85 |
| A | 1.0 | 120 | 131 | 132 | 116 | 88 |
| A | 2.0 | 120 | 130 | 127 | 122 | 93 |
| B | 0.1 | 120 | 130 | 109 | 99 | 76 |
| B | 1.0 | 120 | 125 | 95 | 61 | 48 |
| B | 2.0 | 120 | 132 | 87 | 23 | 17 |

*A = pentasodium salt of nitrilo trimethylenephosphonic acid
B = mixture of polyphosphonic acids

EXAMPLE III

An aqueous solution containing 10% by weight of technical grade sodium sulfite (commercially used in water treating) was prepared. To separate aliquots of this solution was added 1 ppm of cobaltous cation in the form of cobaltous sulfate. Various amounts of the pentasodium salt of nitrilo trimethylenephosphonic acid (DEQUEST 2005) was added to these solutions as indicated in Table III. The solutions were aged 1 day at room temperature and the sulfite concentrations determined as indicated in Example I.

The results obtained are given in Table III. These results indicate that at concentrations greater than about 5% by weight, based on concentration of sodium sulfite, the polyphosphonate drastically reduced the rate of oxidation of the sodium sulfite in the presence of the metallic cation catalyst, Co$^{++}$.

Table III

| Stabilizing Compound | % Stabilizing Compound | Aging Temp., °F | 10% Na$_2$SO$_3$ Solutions Containing 1 ppm CO$^{++}$ ppm Sulfite Concentration Days Aging | | % of Initial Sulfite Remaining After 1 Day |
|---|---|---|---|---|---|
| | | | Initial | 1 | |
| None | 0 | R.T. | 94 | 1.5 | 0 |
| DEQUEST 2005 | 0.1 | R.T. | 112 | 1.5 | 0 |
| DEQUEST 2005 | 0.4 | R.T. | 105 | 1.5 | 0 |
| DEQUEST 2005 | 0.5 | R.T. | 119 | 1.5 | 0 |
| DEQUEST 2005 | 0.6 | R.T. | 130 | 72 | 55 |
| DEQUEST 2005 | 1.0 | R.T. | 130 | 76 | 58 |

EXAMPLE IV

A sulfite composition was prepared by mixing together 90% technical grade sodium sulfite and 10% of the pentasodium salt of nitrilotrimethylenephosphonic acid. This composition was used to prepare a 9% aqueous sulfite solution (10% solution of the sulfite composition). Thirty ppm of $CoSO_4$ was added to an oil field brine water which contained 2.4 ppm oxygen. This aqueous system at 70°F was treated with 50 ppm $SO_3^{--}$ (87.5 ppm of the sulfite composition = 875 ppm of the sulfite solution). The concentration of oxygen in the system and the corrosivity of the system were then measured over the next 35 minutes.

The data obtained are given in Table IV. The results indicate that the stabilized sulfite solution decreased the concentration of oxygen in the oil field brine and decreased the corrosivity of the brine water.

Table IV

| Time min. | Dissolved Oxygen ppm | Corrosion Rate mpy* |
|---|---|---|
| 0 | 2.4 | 8.6 |
| 5 | 1.5 | 8.1 |
| 10 | 0.95 | 6.8 |
| 15 | 0.5 | 5.6 |
| 20 | 0.3 | 4.6 |
| 25 | 0.2 | 4.0 |
| 30 | 0.13 | 3.6 |
| 35 | 0.1 | 3.2 |

*mils per year

EXAMPLE V

A sulfite composition was prepared by mixing together 90% sodium bisulfite and 10% of the pentasodium salt of nitrilo trimethylenephosphonic acid. Another sulfite composition was prepared by mixing together 90% sodium sulfite and 10% of the pentasodium salt of nitrilo trimethylene phosphonic acid. Aqueous sulfite solutions were prepared by dissolving 10% of each of these sulfite compositions in tap water. These sulfite solutions were evaluated at 70°F as oxygen scavengers at a concentration of 57 ppm $SO_3^{--}$ in an oil field brine water which contained 1845 p.p.m. calcium, 97 p.p.m. magnesium, 6.3 p.p.m. iron, 121439 p.p.m. sodium, 48.8 p.p.m. bicarbonate, 186000 p.p.m. chloride, 3125 p.p.m. sulfate, 312561 p.p.m. total dissolved solids, pH = 7.1. Also evaluated for comparison, at the same concentration of $SO_3^{--}$, was sodium bisulfite and a commercial sodium sulfite oxygen scavenger which contained 0.5 ppm $Co^{2+}$ as $CoSO_4$.

The results obtained are given in Table V. These results indicate that the sulfite compositions are excellent oxygen scavengers for treating aqueous systems. In this system they reacted as fast or faster than the catalyzed sodium sulfite and faster than sodium bisulfite.

Table V

| Oxygen Scavenger | Time min. | Dissolved Oxygen ppm |
|---|---|---|
|  | 0 | 2.5 |
| Sodum Bisulfite | 0.25 | 0.5 |
|  | 0.5 | 0.4 |
|  | 1.0 | 0.3 |
|  | 2.0 | 0.25 |
|  | 3.0 | 0.2 |
| 90/10 Sodium Bisulfite/NTP* | 0.25 | 0.25 |
|  | 0.5 | 0.15 |
|  | 1.0 | 0.10 |
|  | 2.0 | 0.05 |
|  | 3.0 | 0 |

Table V-continued

| Oxygen Scavenger | Time min. | Dissolved Oxygen ppm |
|---|---|---|
| Sodium Sulfite + 0.5 ppm $Co^{2+}$ | 0.25 | 0.3 |
|  | 0.5 | 0.15 |
|  | 1.0 | 0.10 |
|  | 2.0 | 0.05 |
|  | 3.0 | 0 |
| 90/10 Sodum Sulfite/NTP* | 0.25 | 0.4 |
|  | 0.5 | 0.15 |
|  | 1.0 | 0 |

*NTP=pentasodium salt of nitrilo trimethylenephosphonic acid

EXAMPLE VI

A sulfite composition containing 90% technical grade sodium sulfite and 10% of the pentasodium salt of nitrilo trimethylenephosphonic acid was used to prepare a 9% aqueous sulfite solution (10% solution of the sulfite composition). This aqueous sulfite soluton was continually added to a brine water drilling fluid (while it was circulating) at a rate of 25 pounds per hour (2.5 pounds per hour of the sulfite composition). The brine water drilling fluid was prepared from the brine water of Example V. It contained some solids picked up during drilling of the well. The drilling fluid in the surface pits contained 1.8 p.p.m. of dissolved oxygen. After treatment with the aqueous sulfite composition the concentration of oxygen in the drilling fluid was less than 0.1 p.p.m. and the corrosion rate as determined from corrosion coupons attached to the drill pipe was decreased from 78.4 mils per year to 3.7 mils per year. The corrosion coupons after treatment of the drilling fluid were bright whereas before treatment the coupons were dark and exhibited pitting.

EXAMPLE VII

An aqueous sulfite composition containing 9% technical grade sodium sulfite and 1% of the pentasodium salt of nitrilo trimethylenephosphonic acid was added to a low solids polymer mud containing a copolymer of vinyl acetate and maleic anhydride (U.S. Pat. No. 3,070543 — Scott). The aqueous sulfite composition was added at the rate of 25 pounds per hour as in Example VI. Before treatment corrosion coupons attached to the drill pipe at a depth of 4700 feet were dark, exhibited pitting, and corroded at the rate of 304 mils per year. After treatment with the aqueous sulfite composition corrosion coupons attached to the drill pipe at a depth of 13,389 feet were bright, exhibited no pitting, and corroded at the rate of only 10 mils per year.

I claim:

1. A sulfite composition which comprises a major proportion of a sulfite compound selected from the group consisting of alkali metal sulfites, alkali metal bisulfites, ammonium sulfite, ammonium bisulfite, and mixtures thereof, and from 1 to 20% by weight, based on the concentration of said sulfite compound, of a stabilizing compound which consists of a water soluble salt of an organic polyphosphonic acid containing at least two phosphonic acid groups per molecule, wherein said composition does not contain any metallic cations which function as catalysts for reacting said sulfite compound with oxygen.

2. The composition of claim 1 wherein said polyphosphonic acid is selected from the group consisting of:

1.

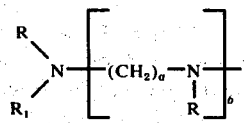

where each R is independently selected from the group consisting of hydrogen, —CH$_2$PO(OH)$_2$, and —(C$_n$H$_{2n}$O)$_c$H wherein $n$ is 2 to 4 and $c$ is 1 to 3; R$_1$ is

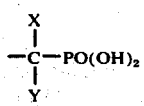

wherein X and Y are independently selected from the group consisting of hydrogen and lower alkyl radicals having 1 to 4 carbon atoms; $a$ is 2 to 6 and $b$ is 0 to 6; provided that at least ½ of the radicals represented by R are —CH$_2$PO(OH)$_2$;

2.

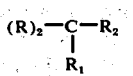

where R is — CH$_2$PO(OH)$_2$, R$_1$ is selected from the group consisting of hydrogen, hydroxyl, and —(C$_n$H$_{2n}$O)$_c$H wherein $n$ is an integer from 2 to 4 and $c$ is an integer from 1 to 3, and where R$_2$ is selected from the group consisting of lower alkyl radicals containing 1 to 5 carbn atoms and

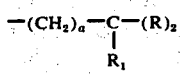

wherein $a$ is an integer from 0 to 8; and

3.

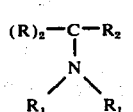

where R is —CH$_2$PO(OH)$_2$, each R$_1$ is independently selected from the group consisting of hydrogen, —CH$_2$PO(OH)$_2$, and —(C$_n$H$_{2n}$O)$_c$H wherein $n$ is an integer from 2 to 4 and $c$ is an integer from 1 to 3 and where R$_2$ is selected from the group consisting of lower alkyl radicals containing 1 to 5 carbon atoms and

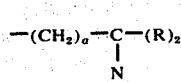

wherein $a$ is an integer from 0 to 8.

3. The composition of claim 2 wherein the concentration of said water soluble salt is from 1 to 20% by weight of the concentration of said sulfite compound, wherein said water soluble salt is in the sodium form, and wherein said sulfite compound is sodium sulfite.

4. The composition of claim 3 wherein the stabilizing compound is

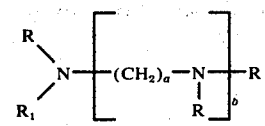

where R is —CH$_2$PO(OH)$_2$, R$_1$ is —CH$_2$PO(OH)$_2$, $a$ is either 2 or 6 and $b$ is 0 to 4.

5. The composition of claim 4 wherein $b$ is 0. to

6. The composition of claim 4 wherein $a$ is 6 and $b$ is 1 to 4.

7. An aqueous sulfite solution which comprises from 5% up to saturation of a sulfite compound selected from the group consisting of alkali metal sulfites, alkali metal bisulfites, ammonium sulfite, ammonium bisulfite, and mixtures thereof, and from 1 to 20% by weight, based on the concentration of said sulfite compound, of a water soluble organic polyphosphonate containing at least two phosphonic acid groups per molecule; wherein the concentration of said polyphosphonate is sufficient to provide a concentration of said sulfite compound which is greater than in the absence of said polyphosphonate upon exposing said solution to the atmosphere for 2 days, and wherein said solution does not contain any metallic cations which function as catalysts for reacting said sulfite compound with oxygen.

8. The solution of claim 7 wherein said polyphosphonate is selected from the group consisting of the free acids and water soluble salts of:

1.

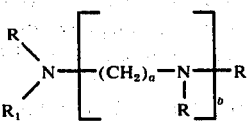

where each R is independently selected from the group consisting of hydrogen, —CH$_2$PO(OH)$_2$, and —(C$_n$H$_{2n}$O)$_c$H wherein $n$ is 2 to 4 and $c$ is 1 to 3; R$_1$ is

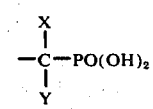

wherein X and Y are independently selected from the group consisting of hydrogen and lower alkyl radicals having 1 to 4 carbon atoms; $a$ is 2 to 6 and $b$ is 0 to 6; provided that at least ½ of the radicals represented by R are —CH$_2$PO(OH)$_2$;

2.

-continued

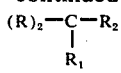

where R is —CH$_2$PO(OH)$_2$, R$_1$ is selected from the group consisting of hydrogen, hydroxyl, and —(C$_n$H$_{2n}$O)$_c$H wherein $n$ is an integer from 2 to 4 and $c$ is an integer from 1 to 3, and where R$_2$ is selected from the group consisting of lower alkyl radicals containing 1 to 5 carbon atoms and

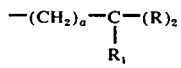

wherein $a$ is an integer from 0 to 8; and
3.

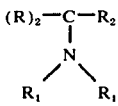

where R is —CH$_2$PO(OH)$_2$, each R$_{1\ 4}$ is independently selected from the group consisting of hydrogen, —CH$_2$PO(OH)$_2$, and —(C$_n$H$_{2n}$O)$_c$H wherein $n$ is an integer from 2 to 4 and $c$ is an integer from 1 to 3, and where R$_2$ is selected from the group consisting of lower alkyl radicals containing 1 to 5 carbon atoms and

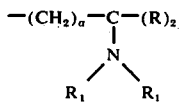

wherein $a$ is an integer from 0 to 8.

9. The solution of claim 9 wherein the concentration of said organic polyphosphonate is from 1 to 20% by weight based on the concentration of said sulfite compound, wherein said organic polyphosphonate is in the sodium form, and wherein said sulfite compound is sodium sulfite.

10. The solution of claim 9 wherein the organic polyphosphonate is

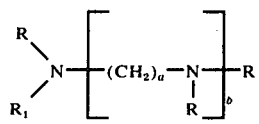

where R is —CH$_2$PO(OH)$_2$, R$_1$ is —CH$_2$PO(OH)$_2$, $a$ is either 2 or 6 and $b$ is 0 to 4.

11. The solution of claim 10 wherein $b$ is 0.

12. The solution of claim 10 wherein $a$ is 6 and $b$ is 1 to 4.

13. The method of decreasing the rate of atmospheric oxidation of a compound selected from the group consisting of alkali metal sulfites, alkali metal bisulfites, ammonium sulfite, ammonium bisulfite, and mixtures thereof which comprises mixing with said sulfite compound an effective amount from 1 to 20% by weight, based on the concentration of said sulfite compound, of a water soluble organic polyphosphonate containing at least two phosphonic acid groups per molecule.

14. The method of claim 13 wherein said organic polyphosphonate is selected from the group consisting of the free acids and water soluble salts of:

1.

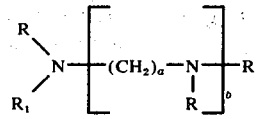

where each R is independently selected from the group consisting of hydrogen, —CH$_2$PO(OH)$_2$, and —(C$_n$H$_{2n}$O)$_c$H wherein $n$ is 2 to 4 and $c$ is 1 to 3; R$_1$ is

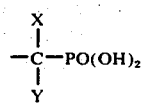

wherein X and Y are independently selected from the group consisting of hydrogen and lower alkyl radicals having 1 to 4 carbon atoms; $a$ is 2 to 6 and $b$ is 0 to 6; provided that at least ½ of the radicals represented by R are —CH$_2$PO(OH)$_2$;

2.

where R is —CH$_2$PO(OH)$_2$, R$_1$ is selected from the group consisting hydrogen, hydroxyl, and —(C$_n$H$_{2n}$O)$_c$H wherein $n$ is an integer from 2 to 4 and $c$ is an integer from 1 to 3, and where R$_2$ is selected from the group consisting of lower alkyl radicals containing 1 to 5 carbon atoms and

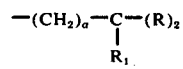

wherein $a$ is an integer from 0 to 8; and
3.

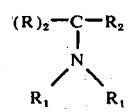

where R is —CH$_2$PO(OH)$_2$, and R$_1$ is independently selected from the group consisting of hydrogen, —CH$_2$PO(OH)$_2$, and —(C$_n$H$_{2n}$O)$_c$H wherein $n$ is an integer from 2 to 4 and $c$ is an integer from 1 to 3, and where R$_2$ is selected from the group consisting of lower alkyl radicals containing 1 to 5 carbon atoms and -continued

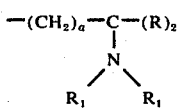

wherein *a* is an integer from 0 to 8.

15. The method of claim 14 wherein the concentration of said organic polyphosphonate is from 1 to 20% by weight based on the concentration of said sulfite compound, wherein said organic polyphosphonate is in the sodium form, and wherein said sulfite compound is sodium sulfite.

16. The method of claim 15 wherein the polyphosphonate is

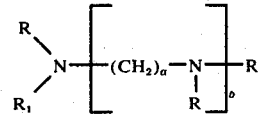

where R is $-CH_2PO(OH)_2$, $R_1$ is $-CH_2PO(OH)_2$, *a* is either 2 or 6 and *b* is 0 to 4.

17. The method of claim 16 wherein *b* is 0.

18. The method of claim 16 wherein *a* is 6 and *b* is 1 to 4.

* * * * *